US010791160B2

(12) United States Patent
Kim et al.

(10) Patent No.: US 10,791,160 B2
(45) Date of Patent: Sep. 29, 2020

(54) METHOD AND APPARATUS FOR CLOUD STREAMING SERVICE

(71) Applicant: SK PLANET CO., LTD., Seongnam-si, Gyeonggi-do (KR)

(72) Inventors: Jungo Kim, Seoul (KR); Taewon Kim, Seoul (KR); Gunhoon Lee, Seongnam-si (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 229 days.

(21) Appl. No.: 15/388,962

(22) Filed: Dec. 22, 2016

(65) Prior Publication Data

US 2018/0013813 A1 Jan. 11, 2018

(30) Foreign Application Priority Data

Jul. 8, 2016 (KR) .................. 10-2016-0087011

(51) Int. Cl.
*G06F 15/16* (2006.01)
*H04L 29/06* (2006.01)
(Continued)

(52) U.S. Cl.
CPC ............ *H04L 65/607* (2013.01); *G06F 16/40* (2019.01); *G06F 16/70* (2019.01); *H04L 65/601* (2013.01);
(Continued)

(58) Field of Classification Search
CPC ..... H04L 65/607; H04L 65/601; H04L 67/08; H04L 67/10; H04L 67/02; G06F 17/30017; G06F 17/30781; H04N 21/4312
See application file for complete search history.

(56) References Cited

U.S. PATENT DOCUMENTS 9,992,499 B2 * 6/2018 Su ...................... H04N 19/1442
2013/0071087 A1 * 3/2013 Motiwala .............. G06F 16/986
386/241
(Continued)

FOREIGN PATENT DOCUMENTS

JP 2014-021423 A 2/2014
KR 10-2012-0096909 A 8/2012
(Continued)

OTHER PUBLICATIONS

Korean Notice of Allowance dated Aug. 21, 2017 in connection with the counterpart Korean Patent Application No. 10-2016-0087011, citing the above reference(s).
(Continued)

*Primary Examiner* — Suraj M Joshi
*Assistant Examiner* — Afele F Woldemariam
(74) *Attorney, Agent, or Firm* — Fenwick & West LLP (57) ABSTRACT

A method and apparatus are provided for a cloud streaming service. A cloud streaming server receives first data corresponding to media source extension (MSE) media from a media source server when a request for content is received from a user device. Then the cloud streaming server creates a first stream by transcoding the first data to a suitable format for processing at the user device, and transmits the created first stream to the user device. Further, the cloud streaming server receives second data corresponding to remaining data except the first data in the content, outputs an execution screen of the content by executing the second data, captures the outputted execution screen, and creates a second stream by encoding the captured screen.

4 Claims, 7 Drawing Sheets

(51) Int. Cl.
  *G06F 16/70*    (2019.01)
  *G06F 16/40*    (2019.01)
  *H04L 29/08*    (2006.01)
  *H04N 21/431*   (2011.01)

(52) U.S. Cl.
  CPC .............. *H04L 67/08* (2013.01); *H04L 67/10* (2013.01); *H04N 21/4312* (2013.01); *H04L 67/02* (2013.01)

(56) References Cited

U.S. PATENT DOCUMENTS

| | | | |
|---|---|---|---|
| 2013/0145267 A1 | 6/2013 | Ramachandran | |
| 2013/0314496 A1* | 11/2013 | Rossato | H04N 19/00909 375/240 |
| 2013/0343450 A1* | 12/2013 | Solka | H04N 19/00472 375/240 |
| 2014/0282766 A1* | 9/2014 | Good | H04N 21/25866 725/93 |
| 2015/0020135 A1* | 1/2015 | Frusina et al. | H04N 21/44 725/116 |
| 2016/0112379 A1* | 4/2016 | Chol | H04L 63/061 |
| 2016/0191627 A1 | 6/2016 | Huang et al. | |

FOREIGN PATENT DOCUMENTS

| | | |
|---|---|---|
| KR | 10-2014-0111336 A | 9/2014 |
| KR | 10-2016-0028226 A | 3/2016 |

OTHER PUBLICATIONS

Korean Office Action dated May 31, 2017 from KIPO in connection with the counterpart Korean Patent Application No. 10-2016-0087011, citing the above reference(s).

Extended European Search Report dated Apr. 11, 2017 from European Patent Office in connection with the counterpart European Patent Application No. 16205593.3, citing the above reference(s).

Hatano, "HTML5 Web standard API", 2014, pp. 1-27, Japan.

Hiramatsu et al., "Prototype Cloud-Based Viewing System Enabling Playback without Depending on the Terminal Performance" 2015, 9 Pages, Japan.

Timmerer et al., "Transcoding and Streaming-as-a-Service for improved Video Quality on the Web" 2016, 3 pages, Austria.

Japanese Office Action dated Jul. 24, 2018, in connection with the Japanese Patent Application No. 2016-251522 citing the above reference(s).

Corresponding Office Action and translation to Japanese Application No. 2016-251522, dated Jul. 24, 2018, 12 pages.

Futomi Hatano, "HTML5 Web standard API Bible"; first edition, 2014, pp. 9-21 and 442-452.

Kazushige Hiramatsu et al. "Prototype Cloud-Based Viewing System Enabling Playback without Depending on the Terminal Performance", 2015, The Institute of Image Information and Television Engineers, paper No. 31D-3, 9 pages.

Timmerer, C., et al., "Transcoding and Streaming-as-a-Service for improved Video Quality on the Web", May 10-13, 2016, Proceedings of MMSys' 16, pp. 1-3, Retrived from Internet: <URL: http://www-itec.uni-klu.ac.at/bib/files/MMSys2016-paper.pdf>.

* cited by examiner

METHOD AND APPARATUS FOR CLOUD STREAMING SERVICE

CROSS REFERENCE TO RELATED APPLICATION

This application claims the priority of Korean Patent Application No. 10-2016-0087011, filed on Jul. 8, 2016 in the KIPO (Korean Intellectual Property Office), the disclosure of which is incorporated herein by reference.

TECHNICAL FIELD

The present invention relates generally to cloud streaming technology and, more particularly, to a method and apparatus for providing a cloud streaming service capable of effectively managing resources of a cloud streaming server by reducing unnecessary duplicated playback processing for media source extension (MSE) media in the entire execution screen of content provided through cloud streaming.

BACKGROUND

Details disclosed in this section merely offers background information regarding embodiments of the present invention. No determination has been made, and no assertion is made, as to whether any of the below might be applicable as prior art with regard to the present invention.

With the development of computer network technologies, a traditional computing environment depending on independent hardware performance of each terminal is now evolving into a cloud computing system that provides a service, requested by the terminal, through the utilization of all computing resources on a network.

The cloud computing may be defined as 'on-demand outsourcing service of computing resources' through an information communication network such as the Internet. In the cloud computing environment, a service provider provides necessary services to users by integrating data centers, deployed at several places, by means of virtualization technology. A user can select and use a desired service in a virtual space created through virtualization technology at any time rather than using computing resources, such as applications, storage, operating system (OS), security, etc., installed in his or her own terminal. Namely, the cloud computing is a computing service that allows a user to rent and use hardware/software computing resources, distributed like cloud, and to pay a usage fee. Thus, the cloud computing refers to technology for integrating and providing computing resources existing at physically different locations by means of virtualization technology.

Using such cloud computing, a user can access the cloud network through his or her terminal that performs only a network access and basic functions, can perform a task that requires high-volume storage and high-performance computing resources, and can be provided with various services.

The cloud streaming service is a service based on this cloud computing environment. Specifically, the cloud streaming service executes contents such as web applications at a server by utilizing server resources, captures and encodes an execution screen as a GUI screen, and transmits it to the terminal in real time. Since the terminal performs only input and output functions, a user can use applications or contents requiring high-performance computing resources regardless of the capability of the terminal.

Meanwhile, the World Wide Web Consortium (W3C), which is a web standardization organization, announced HTML5 as the fifth international standard of HTML in 2014. This allows providing a video service which needs no flash plug-in. Currently, YouTube or the like is offering an HTML5-based service, and smart phone platforms such as iPhone and Android are embedding a web browser that supports main functions of HTML5.

Media source extension (MSE), which is one of key features of HTML5, is an application program interface (API) designed for video streaming playback. MSE offers a video streaming service by controlling video, encoded at different bitrates, in the unit of chunks with a given split length.

In a typical cloud streaming system, the playback of content is wholly controlled by a cloud streaming server. Therefore, in case of content that contains MSE media, the server embeds an MSE media player and thereby plays MSE media. Then the server captures and encodes the entire browser screen including an MSE media playback screen and streams the encoded entire screen to a user device.

In the entire browser screen, the remaining parts such as a user interface (UI) or images, except MSE media, consumes less relatively system resources of the cloud streaming server when executed. On the other hand, the MSE media which is video requires, for playback, much consumption of system resources of the cloud streaming server, thus causing a reduction in the session number of simultaneously supportable user devices.

Additionally, since the user device decodes and thereby plays received streams, the MSE media are played in duplicate at both the server and the user device. Unfortunately, this is very inefficient.

SUMMARY

In order to address the aforesaid or any other issue, the present invention provides a solution of effectively managing resources of a cloud streaming server by allowing the cloud streaming server to execute only the remaining parts except MSE media without playing the MSE media, to create separately a stream for the MSE media and a stream for the remaining parts, and to transmit the separate streams to a user device.

Additionally, this invention prevents duplicated playback of MSE media by allowing the user device only to play the MSE media.

According to an embodiment of the present invention, a cloud streaming server may include a media source storage module configured to store first data corresponding to media source extension (MSE) media; a browser module configured to receive the first data corresponding to the MSE media in content requested by a user device and to store the received first data in the media source storage module; and a transcoding module configured to create a first stream by transcoding the first data, stored in the media source storage module, to a suitable format for processing at the user device. In this server, the created first stream is transmitted to the user device.

In the cloud streaming server, the browser module may be further configured to receive second data corresponding to remaining data except the first data in the content, to execute the second data, and to output an execution screen of the content.

The cloud streaming server may further include a screen virtualization processing module configured to capture the outputted execution screen and to create a second stream by encoding the captured screen. In this server, the created second stream is transmitted to the user device.

In the cloud streaming server, the browser module may be further configured to process transparently a part corresponding to the first data in the execution screen.

In the cloud streaming server, the first data may be a video chuck having a given split length.

According to an embodiment of the present invention, a user device for requesting content of a cloud streaming server may include a first stream storage module configured to receive and store a first stream which is created by transcoding first data corresponding to media source extension (MSE) media in the content; a second stream storage module configured to receive and store a second stream created from second data corresponding to remaining data except the first data in the content; a first decoding module configured to decode the stored first stream; a second decoding module configured to decode the stored second stream; and a playback module configured to create a final output screen through overlay processing of the decoded first and second streams.

According to an embodiment of the present invention, a cloud streaming service method performed by a cloud streaming server may include steps of receiving first data corresponding to media source extension (MSE) media from a media source server when a request for content is received from a user device; creating a first stream by transcoding the first data to a suitable format for processing at the user device; and transmitting the created first stream to the user device.

This method may further include steps of receiving second data corresponding to remaining data except the first data in the content; outputting an execution screen of the content by executing the second data; capturing the outputted execution screen; and creating a second stream by encoding the captured screen.

In this method, the outputting step may include processing transparently a part corresponding to the first data in the execution screen.

According to an embodiment of the present invention, a cloud streaming service method performed by a user device may include steps of receiving a first stream from a cloud streaming server and then storing the first stream, the first stream being created by transcoding first data corresponding to media source extension (MSE) media in content; receiving a second stream from the cloud streaming server and then storing the second stream, the second stream being created from second data corresponding to remaining data except the first data in the content; decoding the stored first stream; decoding the stored second stream; and creating a final output screen through overlay processing of the decoded first and second streams.

According to this invention, the cloud streaming server does not play MSE media when executing, capturing and encoding content including the MSE media. Instead, the cloud streaming server merely performs transcoding of a stream corresponding to the MSE media in a suitable format for processing at the user device. This may reduce a system load of the cloud streaming server and also increase the session number of simultaneously supportable user devices.

Like this, processing for playback of MSE media is performed only once at the user device, thus removing a duplicated playback problem of MSE media.

Other various advantages and effects will be disclosed explicitly or implicitly in embodiments of this invention to be described below in detail.

DETAILED DESCRIPTION

Now, embodiments of the present invention will be described with reference to the accompanying drawings.

In the following description and the accompanying drawings, however, well known techniques may not be described or illustrated in detail to avoid obscuring the subject matter of the present invention. Through the drawings, the same or similar reference numerals denote corresponding features consistently.

The terms and words used in the following description, drawings and claims are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "1", "2", "first", or "second" used in various embodiments of this disclosure may modify various elements of such embodiments but does not limit the corresponding elements. The above expressions do not limit the sequence and/or importance of the elements but may be used for distinguishing one element from other elements.

When it is stated that a certain element is "coupled to" or "connected to" another element, the element may be directly coupled or connected to another element, or a new element may exist between both elements. In contrast, when it is stated that a certain element is "directly coupled to" or "directly connected to" another element, a new element does not exist between both elements.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise" and "have" as well as derivatives thereof, mean inclusion without limitation.

In this disclosure, the term "content" refers to any type of digital content such as video, image, text, and audio/sound. Content may include content data that exists in various forms such as a web application, a real-time broadcast, a VOD service, and a game service.

Especially, in this disclosure, video data contained in content may be, for example, MSE media in accordance with HTML5-based web standard.

The present invention is not limited to specific types of content and can be applied to any type of content capable of being offered to a user device through cloud streaming.

Now, a method and apparatus for providing a cloud streaming service according to an embodiment of this invention will be described with reference to the drawings.

Figure 1:
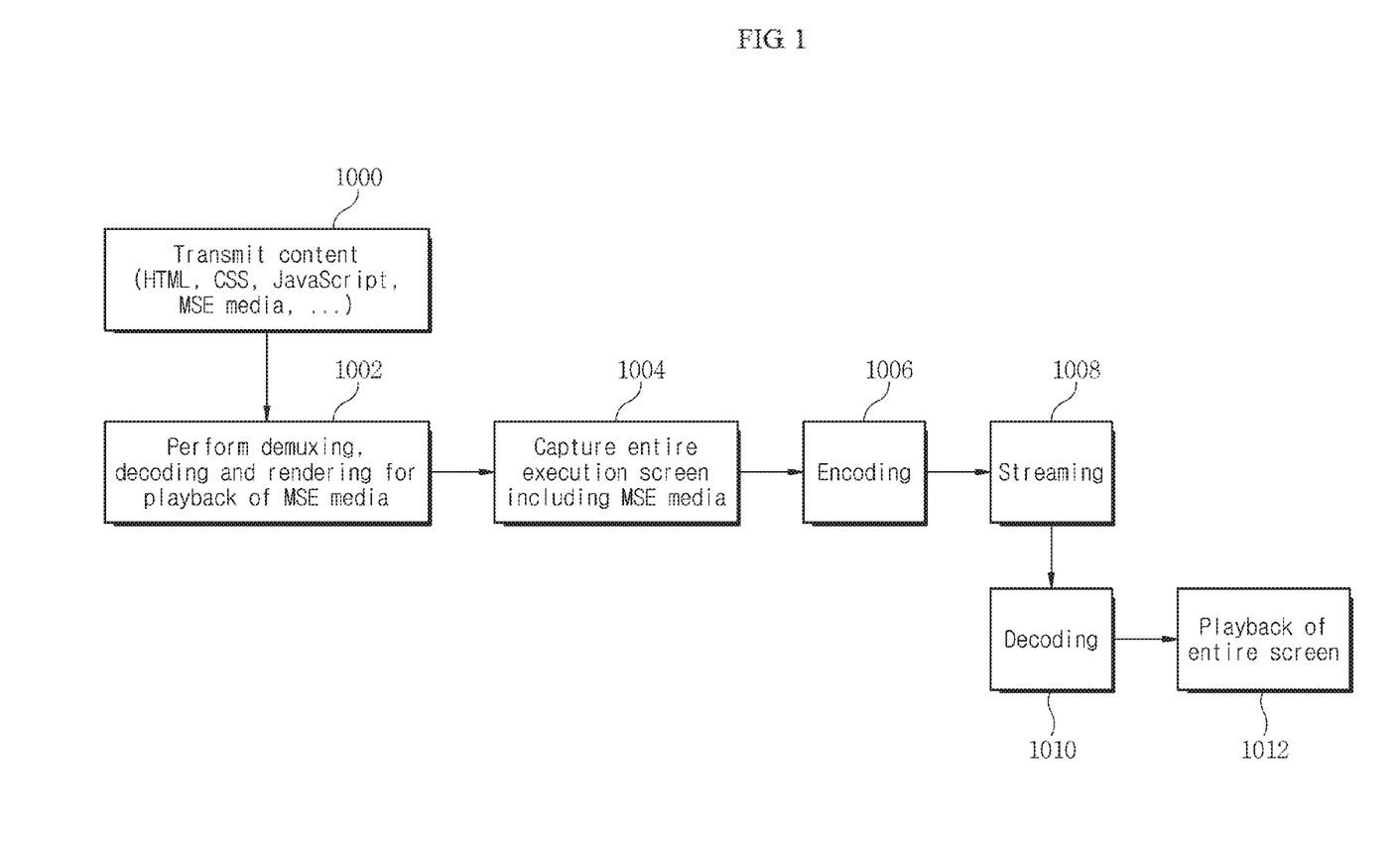
FIG. 1 is a block diagram illustrating a normal process of cloud streaming service.

FIG. 1 is a block diagram illustrating a normal process of cloud streaming service.

In a typical cloud streaming service, when any content formed of an HTML file, a CSS file, a JavaScript file, MSE media, etc. is received from a content server such as a web application server or a media source server (step 1000), a cloud streaming server totally controls the execution of the entire content including the playback of the MSE media.

Specifically, the cloud streaming server executes and plays the entire content including MSE media through demuxing, decoding and rendering, then captures the entire execution screen including a playback screen of the MSE media, then encodes the captured screen, and transmits the encoded screen to a user device in a streaming manner (steps 1002, 1004, and 1006). The user device decodes a received screen (step 1010) and then outputs the decoded entire screen including the MSE media (step 1012).

Namely, since the cloud streaming server plays the MSE media, captures the entire browser screen containing an MSE media playback screen together with a user interface (UI), images, and the like, and transmits the captured entire screen as a single stream, the MSE media undergoes twice playback processing at the cloud streaming server and at the user device. Unfortunately, this causes unnecessary consumption of system resources in the cloud streaming server, thus reducing the number of simultaneously supportable user devices.

Figure 2:
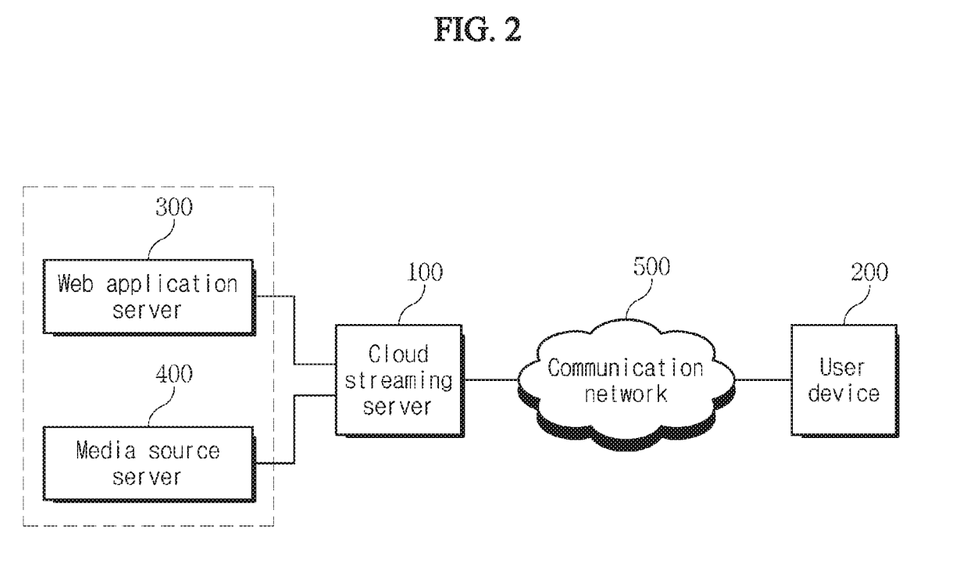
FIG. 2 is a block diagram illustrating a cloud streaming service system according to an embodiment of the present invention.

FIG. 2 is a block diagram illustrating a cloud streaming service system according to an embodiment of the present invention.

Referring to FIG. 2, the cloud streaming service system according to an embodiment of this invention may include, but not limited to, a cloud streaming server 100, a user device 200, a web application server 300, a media source server 400, and a communication network 500.

The user device 200 is an electronic device or terminal that can transmit or receive various data through the communication network 500 in response to user's manipulations.

The user device 200 may access the cloud streaming server 100 through the communication network 500. Thereby the user device 200 may transmit a user input to the cloud streaming server 100 and also receive various kinds of information from the cloud streaming server 100 in a cloud streaming manner.

For the above, the user device 200 may include a memory for storing a browser, programs, protocols, etc., a microprocessor for executing and controlling various programs, and the like.

Particularly, the user device 200 that accesses the cloud streaming server 100 via the communication network 500 may send a request for the execution of specific content selected from many contents provided by the cloud streaming server 100 and then receive certain information resulting from the execution of the specific content from the cloud streaming server 100 in the streaming manner. Therefore, a user of the user device 200 can use the specific content.

At this time, the specific content, except MSE media, is actually executed at the cloud streaming server 100 which is located remotely from the user device 200, and the user of the user device 200 can use the specific content as if the content is executed at the user device 200.

The user device 200 may basically have a function of receiving and decoding encoded streaming data and further have a function of outputting decoded video data.

The use device 200 may be implemented in various forms. For example, the user device 200 disclosed herein may be a mobile device such as a smart phone, a tablet PC, a PDA (Personal Digital Assistant), a PMP (Portable Multimedia Player), an MP3 player, and the like, or a stationary device such as a smart TV, a desktop computer, a set-top box, and the like.

Additionally, the user device 200 may or may not have an output function. In case of failing to have an output function, the user device 200 may be connected to an output device (not shown), such as a TV, a monitor or a projector, and transmit content data to the connected output device so as to output the content, received from the cloud streaming server 100, through the output device.

According to a recent trend of convergence in digital devices, a great variety of mobile devices or their equivalences may be used as the user device 200 in the present invention. Furthermore, any device that can receive encoded data from the cloud streaming server 100 and also decode the received data for playback may be used as the user device 200 in embodiments of this invention.

The cloud streaming server 100, which is an element of providing a cloud streaming service, provides a service or function associated with specific content to the user device 200 through a screen virtualization function in response to a request of the user device 200. The screen virtualization function refers to implementing an execution screen of specific content at the cloud streaming server 100, as if being executed at the user device 200, and then providing the screen to the user device 200.

Therefore, the cloud streaming server 100 executes various contents, e.g., an UI application, a game application, etc., creates and encodes a capture image of an execution screen, and then transmits the encoded capture image to the user device 200 in the streaming manner.

Particularly, in order to reduce a system load and also prevent a duplicated playback by both the cloud streaming server 100 and the user device 200, the cloud streaming server 100 has a function of creating a separate stream (i.e., the first stream) by transcoding MSE media without playing the MSE media.

For a streaming support, the MSE media adds a buffer-based original option to HTML5 video. Previously required is downloading the entire video file before playback or streaming media by using a separate multimedia player or plug-in. However, in case of MSE media, such an additional function is not required. The MSE media enables a streaming service under control for video, encoded at different bitrates, in the unit of chunks with a given split length.

For this, MPEG-DASH (Dynamic Adaptive Streaming over HTTP) which is adaptive bitrates streaming may be used. DASH may use contents encoded with various types of codec such as H.265, H.264, VP9, and the like.

In particular, the cloud streaming server 100 according to an embodiment of this invention may create the second stream in response to a request signal of the user device 200 by executing the remaining parts, such as a UI application, of the execution screen except a display part for MSE media and instead processing the MSE media part transparently.

By providing the first and second streams to the user device 200, the cloud streaming server 100 can support a more economical cloud streaming service with a reduced server load.

The web application server 300 and the media source server 400 according to an embodiment of this invention receive a content request signal from the cloud streaming server 100 and the user device 200 and then provide various contents. The web application server 300 may provide a web application which is a set of web pages formed of HTML files, CSS files, JavaScript files, and the like.

The HTML file refers to a file written in the html language which is a computer language for describing the structure of hypertext. Actually, numerous web pages found in the Internet may be basically formed of such HTML files. The CSS file refers to a style sheet that predefines the whole style of a web document. The JavaScript file refers to a file created using the JavaScript language for rendering a dynamic screen to a webpage, contrary to a static HTML file.

The media source server 400 may provide a video stream and, especially, provide chunks into which video encoded at different bitrates is split with a given length.

The web application server 300 and the media source server 400 may be implemented as separate servers or as a single server, i.e., a content server. The web application server 300 and the media source server 400 may refer to a third-party operator's server, e.g., a QAM transmitter of a cable TV or an IPTV Head-End system, for possessing and managing contents.

The web application server 300 and the media source server 400 may be connected to the cloud streaming server 100 and then deliver data to the cloud streaming server 100 so as to support a cloud streaming service.

The communication network 500 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the communication network 500 may use wired communication technique such as Ethernet, xDSL (ADSL, VDSL), HFC (Hybrid Fiber Coaxial cable), FTTC (Fiber To The Curb), FTTH (Fiber To The Home), or the like.

Additionally, the communication network 500 includes a plurality of access networks (not shown) and a core network (not shown), and may further include an external network, e.g., the Internet (not shown). Herein, the access network is to perform wired/wireless communication with the user device 200 and may be formed of a plurality of base stations, also referred to as BTS (Base Transceiver Station), NodeB, or eNB (eNodeB or evolved Node B), and controllers such as BSC (Base Station Controller) and RNC (Radio Network Controller).

Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as the Internet.

The core network is a network system that performs main functions for a mobile communication service such as mobility control and switching between the access networks. Namely, the core network performs circuit switching or packet switching and further manages and controls a packet flow in the mobile network. In addition, the core network may manage mobility between frequencies, control traffic therein and in the access network, and control interworking with other network such as Internet. The core network may be formed of SGW (Serving GateWay), PGW (PDN GateWay), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet may deliver information, offered from the cloud streaming server 100, the web application server 300 and the media source server 400, to the user device 200 through the core network and the access network. Similarly, the Internet may deliver information, offered from the user device 200, to the cloud streaming server 100, the web application server 300 and the media source server 400 through the core network and the access network. This is, however, exemplary only and not to be construed as a limitation. Alternatively, the cloud streaming server 100, the web application server 300 and the media source server 400 may be integrated with the core network.

In addition to the above-discussed communication technique, any other communication technique well known in the art or to be developed may be used for this invention.

In view of hardware, the cloud streaming server 100 has the same configuration as a typical web server or network server. However, in view of software, the cloud streaming server 100 includes a program module having codes written in computer languages such as C, C++, Java, Visual Basic, Visual C, and the like.

Also, the cloud streaming server 100 may be implemented as a single super computer or in the form of a distributed computing system for offering an independent VM (Virtual Machine) to users on the same hardware platform in which several computers are connected to operate like a single computer.

Figure 3:
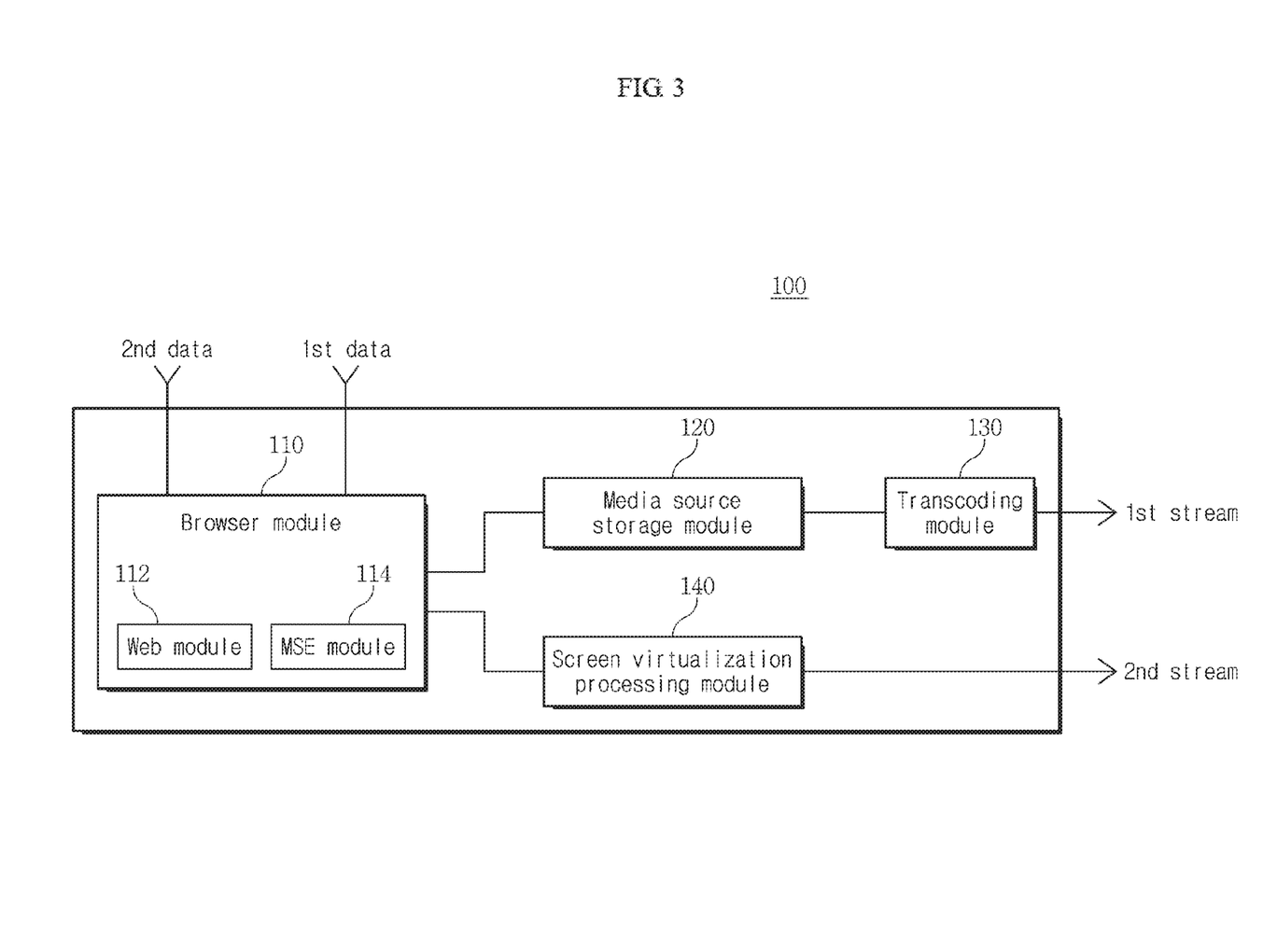
FIG. 3 is a block diagram illustrating a cloud streaming server for providing a cloud streaming service according to an embodiment of the present invention.

FIG. 3 is a block diagram illustrating a cloud streaming server for providing a cloud streaming service according to an embodiment of the present invention.

Referring to FIG. 3, the cloud streaming server 100 may include a browser module 110, a media source storage module 120, a transcoding module 130, and a screen virtualization processing module 140.

The browser module 110 may include a web module 112 and an MSE module 114. The MSE module 114 receives the first data, corresponding to MSE media in content requested by a user, from the media source server 400 and then stores the first data in the media source storage module 120. The web module 112 receives the second data, corresponding to the remaining data except the first data in the requested content, from the web application server 300, executes the second data, and outputs an execution screen.

The first data may be a video chunk of MSE media, and the second data may be a webpage that contains a UI application, a still image, a moving animation, etc. which are formed of HTML, CSS, JavaScript, and the like.

Typically, the MSE module 114 plays MSE media, and the browser module 110 outputs the entire execution screen containing the MSE media. Contrary to this, in order to effectively manage system resources of the cloud streaming server 100, this invention redefines the MSE module 114 such that the playback of MSE media does not occur.

When outputting an execution screen of the remaining parts except the MSE media, the browser module 110 may process the MSE media part transparently by adjusting a transparency rate. Thereafter, when the user device 200 creates an output screen, a playback screen for the MSE media will be combined with the transparent part.

The media source storage module 120 may store various commands for processing a cloud streaming service according to an embodiment of this invention and also temporarily store video chunks, which are the first data received from the MSE module 114, so as to perform buffering before transcoding.

The transcoding module 130 creates the first stream for the provision of a streaming service by performing transcoding of the first data in a suitable format for the user device 200 to receive and process.

The screen virtualization processing module 140 creates the second stream by capturing and encoding an execution screen of the second data. Namely, the screen virtualization processing module 140 may create the second stream by capturing the execution screen having the transparent part outputted from the browser module 110 through coding technique of the second stream and processing it in a compressive saving manner of images.

Although it is desirable that the format of the first and second streams uses the same format for convenient decoding at the user device 200, the use of different formats is not excluded.

When a signal of a content request is received from the user device 200, the cloud streaming server 100 transmits, in response to the request, the first and second streams to the user device 200 in the streaming manner.

Figure 4:
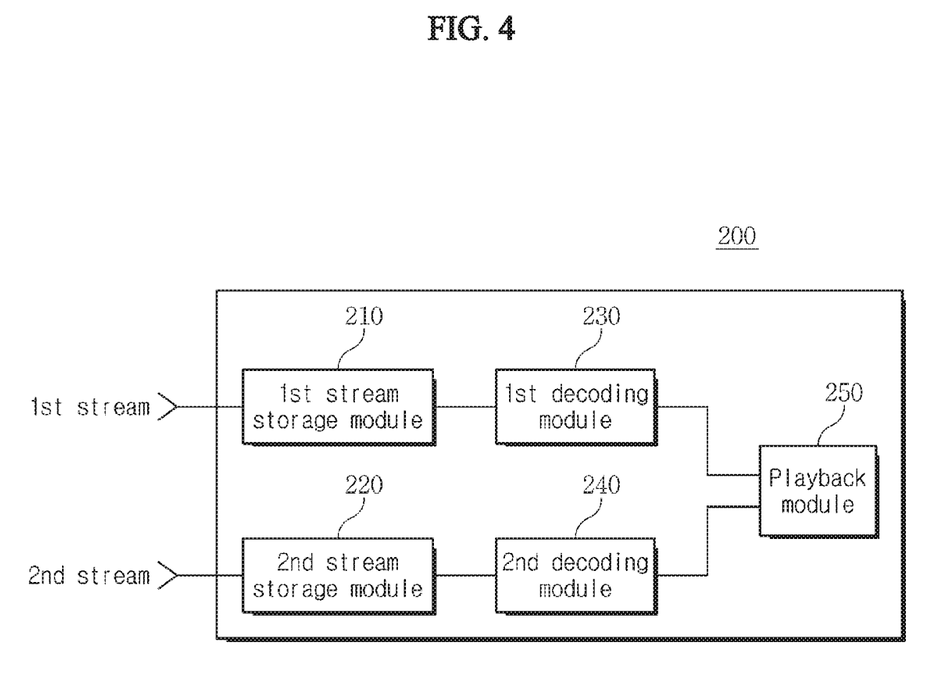
FIG. 4 is a block diagram illustrating a user device for providing a cloud streaming service according to an embodiment of the present invention.

FIG. 4 is a block diagram illustrating a user device for providing a cloud streaming service according to an embodiment of the present invention.

Referring to FIG. 4, the user device 200 may include a first stream storage module 210, a second stream storage module 220, a first decoding module 230, a second decoding module 240, and a playback module 250.

The first and second stream storage modules 210 and 220 store, respectively, the first and second streams received from the cloud streaming server 100 and perform a buffering function before decoding.

The first decoding module 230 may decode the first stream about MSE media and then transmit it to the playback module 250. The decoding for MSE media is not performed at the cloud streaming server 100 and performed only at the user device 200.

The second decoding module 240 may decode the second stream and then transmit it to the playback module 250.

The playback module 250 according to an embodiment of this invention may receive decoded data of both the first and second streams and then combine both the received data.

The playback module 250 may perform overlay processing for combination of the decoded first and second streams and then create the final output screen.

Although main elements of the user device 200 are described with reference to FIG. 4, any other element may be further included in the user device 200.

Figure 5:
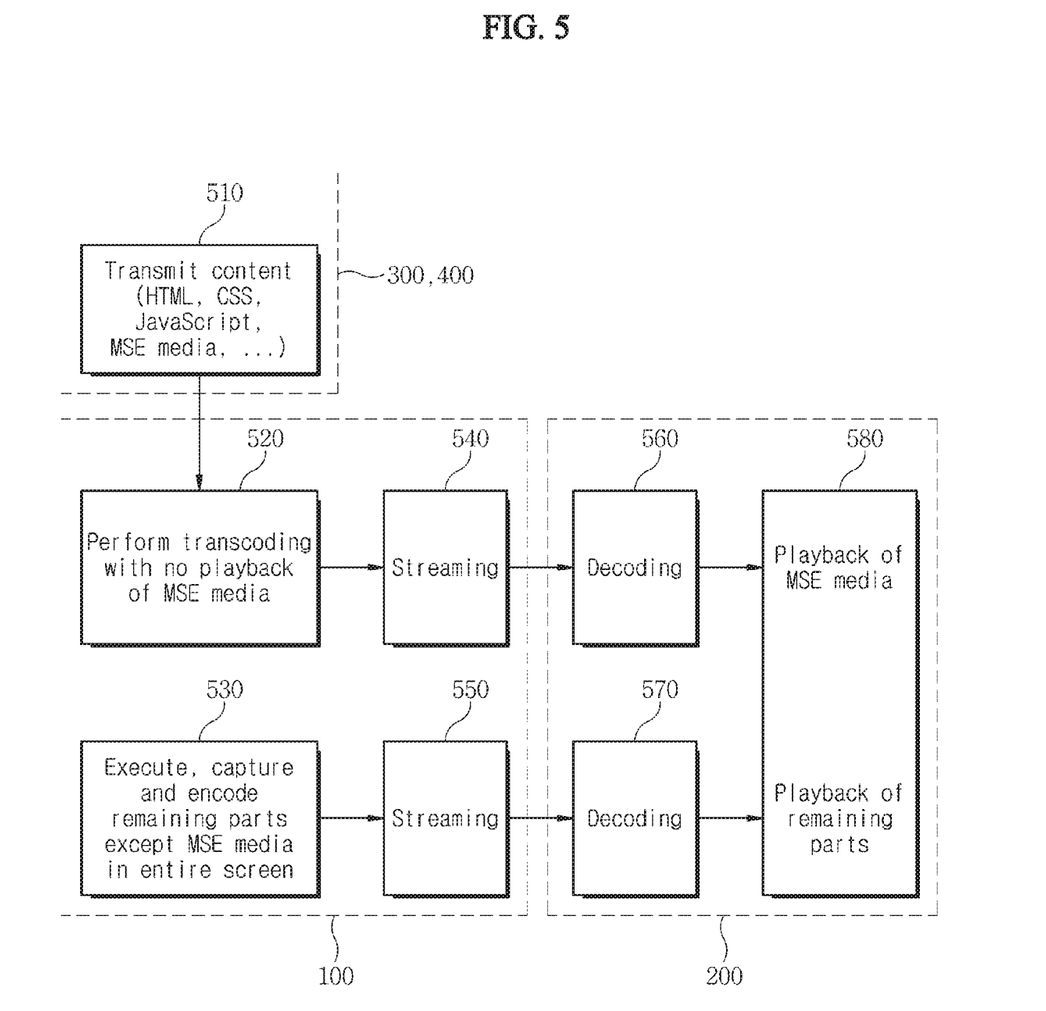
FIG. 5 is a block diagram illustrating a cloud streaming service process according to an embodiment of the present invention.

FIG. 5 is a block diagram illustrating a cloud streaming service process according to an embodiment of the present invention.

From the web application server 300 and the media source server 400, the cloud streaming server 100 receives content, namely, the first data which is a video chunk of MSE media, and the second data which is a webpage formed of HTML, CSS, JavaScript, and the like (step 510). At the cloud streaming server 100, the MSE media and the remaining parts are processed separately. Namely, the MSE module 114 in the cloud streaming server 100 is redefined such that the playback of MSE media is not performed in the cloud streaming server 100. Instead, the cloud streaming server 100 performs transcoding the MSE media in a suitable format for processing at the user device 200 and thereby creates the first stream (step 520).

Additionally, the cloud streaming server 100 executes the second data which is the remaining parts except the first data in the entire screen of content requested by the user device 200. Then the cloud streaming server 100 captures and encodes the resultant output screen and thereby creates the second stream (step 530). Contrary to conventional technique that creates a single stream for the entire execution screen including MSE media, an embodiment of this invention creates two distinguished streams.

The created first and second streams are transmitted to the user device 200 in the streaming manner (steps 540 and 550).

The user device 200 performs decoding of the first and second streams (steps 560 and 570) and then creates an output screen by combining and playing two kinds of decoded data through the playback module 250 (step 580).

Figure 6:
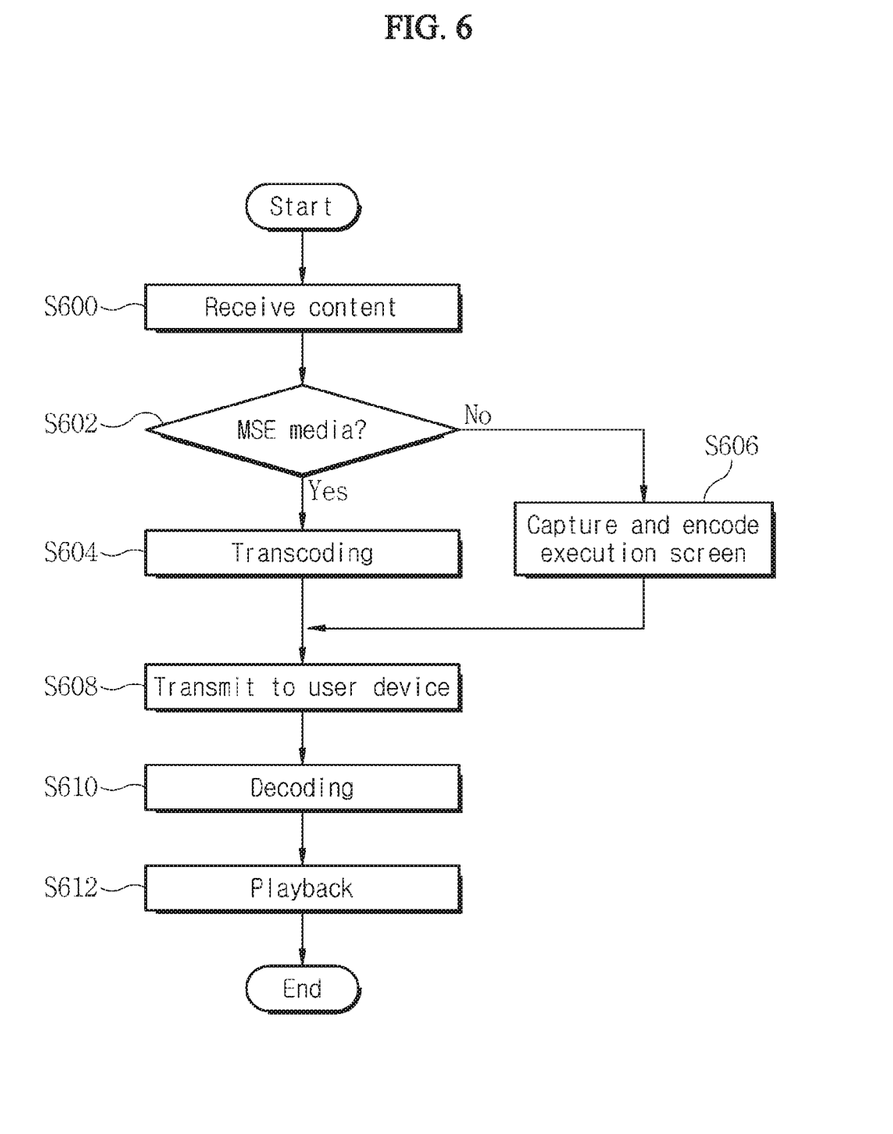
FIG. 6 is a flow diagram illustrating a cloud streaming service process according to an embodiment of the present invention.

FIG. 6 is a flow diagram illustrating a cloud streaming service process according to an embodiment of the present invention.

Referring to FIG. 6, the cloud streaming server 100 receives content from the web application server 300 and the media source server 400 (step S600) and then identifies MSE media (step S602). For MSE media, the cloud streaming server 100 does not perform playback and creates the first stream by performing only transcoding in the form of being processed at the user device 200 (step S604). For the other parts except the MSE media, the cloud streaming server 100 creates the second stream by creating, capturing and encoding an execution screen (step S606). Two kinds of created streams are transmitted to the user device 200 in the streaming manner (step S608). The user device 200 decodes received streams (step S610) and performs playback through overlay processing of the decoded data (step S712). Like this, the cloud streaming server 100 merely creates streams without performing the playback of MSE media, and only the user device 200 performs such playback of MSE media. This not only reduces a load of the cloud streaming server 100, but also prevents inefficiency caused by duplicated playback of MSE media.

Figure 7:
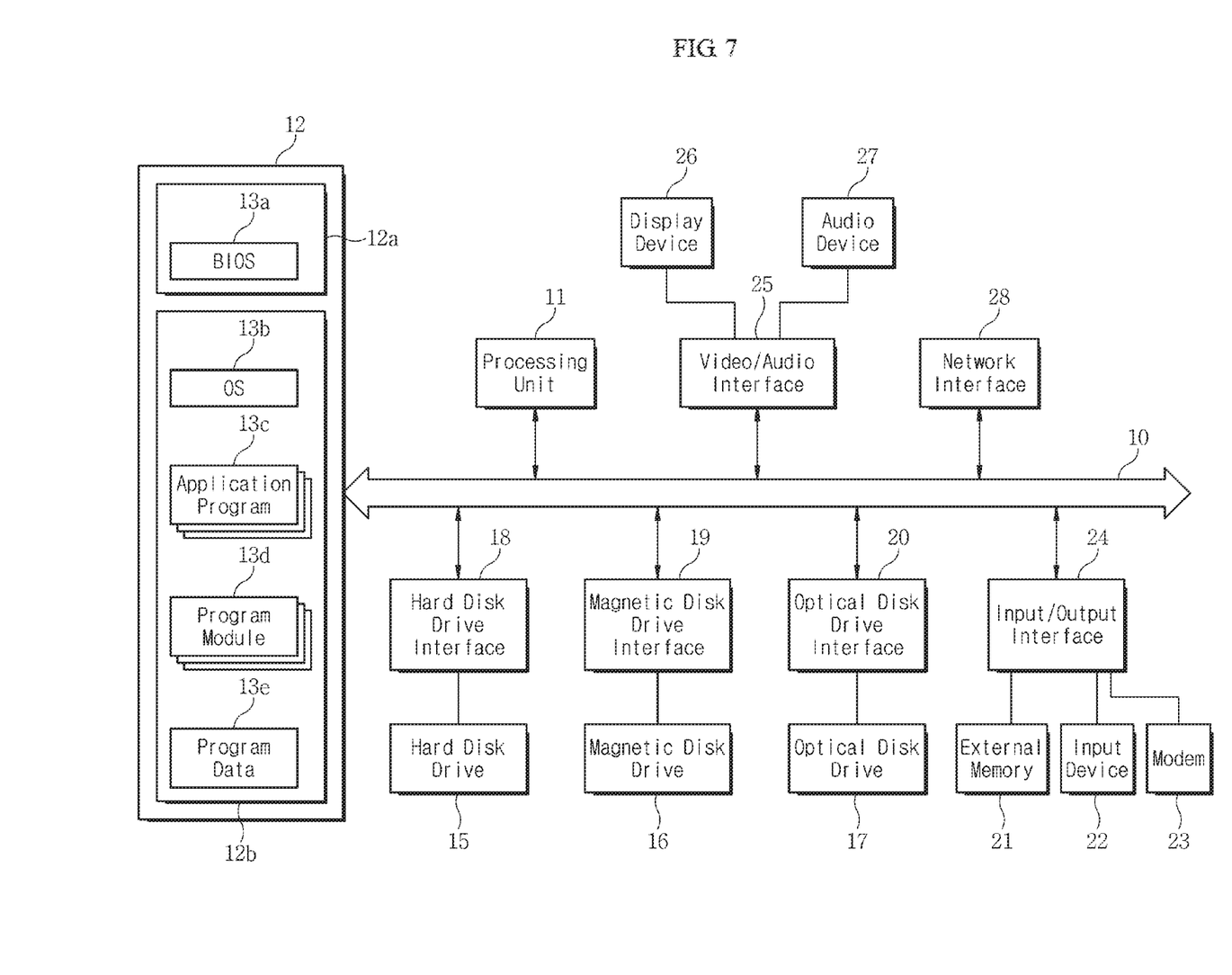
FIG. 7 is a block, diagram illustrating an operating environment of devices for a cloud streaming service according to an embodiment of the present invention.

FIG. 7 is a block diagram illustrating an operating environment of devices for a cloud streaming service according to an embodiment of the present invention.

FIG. 7 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems.

Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 7, an exemplary computing system for implementing the invention includes a processing unit 11, a system memory 12, and a system bus 10 that couples various system components including the system memory 12 to the processing unit 11.

The processing unit 11 can execute computer-executable instructions designed to implement features of this invention.

The system bus 10 may be any of several, types of bus structures including a memory bus or memory controller, a peripheral bus, and a local bus using any of a variety of bus architectures.

The system memory 12 includes read only memory (ROM) 12a and random access memory (RAM) 12b. A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media. The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system.

Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored in the hard disk 15, the magnetic disk 16, the optical disk 17, the ROM 12a, or the RAM 12b. The cloud streaming service providing method according to this invention may be implemented with program modules, which may be stored in at least one of the hard disk 15, the magnetic disk 16, the optical disk 17, the ROM 12a or the RAM 12b and then executed by being loaded by the processing unit 11.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 28, through which the computing system receives data from external sources and/or transmits data to external sources.

The network interface 28 facilitates the exchange of data with remote devices. For example, if the computing system is the user device 200, the user device 200 may transmit or receive information to or from the cloud streaming server 100 through the network interface 28. If the computing system is the cloud streaming server 100, the cloud streaming server 100 may transmit or receive information to or from the user device 200 through the network interface 28. The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 7 represents a suitable operating environment for the present invention, the principles of this invention may be employed in any system that is capable of, with suitable modification if necessary, implementing the principles of this invention. The environment illustrated in FIG. 7 is illustrative only and by no means represents even a small portion of the wide variety of environments in which the principles of this invention may be implemented.

Programs of this invention and various kinds of information generated during the execution of such programs may be stored and accessed from any of the computer-readable media associated with the computing system as shown in FIG. 7. For example, portions of such program modules and portions of associated program data may be included in the operating system 13b, the application programs 13c, the program modules 13d and/or the program data 13e, for storage in the system memory 12.

When a mass storage device such as the hard disk is coupled to the computing system, such program modules and associated program data may also be stored in the mass storage device.

In a networked environment, program modules depicted relative to the computing system, or portions thereof, can be stored in a remote computer system connected through the modem 23 or network interface 25 of the input/output interface 24. Execution of such modules may be performed in a distributed environment as previously described.

Process steps may be performed by one or more programmable processors that execute a computer program so as to perform functions by operating on-input data and producing outputs. Additionally, process steps may be also implemented by a specific-purpose logic circuitry such as a field programmable gate array (FPGA) or an application-specific integrated circuit (ASIC), and also devices may be implemented by them.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

The computer-readable storage medium suitable for storing computer program commands and data may include magnetic media such as a hard disk, a floppy disk and a magnetic tape, optical media such as CD-ROM (Compact Disk Read Only Memory) and DVD (Digital Video Disk), magneto-optical media such as a floptical disk, and semiconductor memories such as ROM (Read Only Memory), RAM (Random Access Memory), flash memory, EPROM (Erasable Programmable ROM) and EEPROM (Electrically EPROM).

A processor and memory may be supplemented by a special-purpose logic circuit or integrated therewith.

While this disclosure contains many specific implementation details, these should not be construed as limitations on the scope of the invention or of what may be claimed, but rather as descriptions of features that may be specific to particular embodiments of particular invention.

Certain features that are described in this disclosure in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed.

In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

This invention has a good possibility of sales on the market or business and also has industrial applicability suitable for practical and apparent implementation.

What is claimed is:

1. A cloud streaming server comprising:
   memory module configured to store first data of content, wherein the content includes the first data corresponding to a video chunk having a given split length and second data corresponding to remaining data except the first data;
   one or more processors configured to execute instructions stored in the memory and to:
      receive the first data and the second data from a content server when a request for the content is received from a user device:
      store the received first data in the memory;
      execute the second data to render an execution screen including a transparent portion;
      create, without playing the first data at the cloud streaming server, a first stream by transcoding the first data stored in the memory to a suitable format for processing at the user device; and
      capture the rendered execution screen and create a second stream by encoding the captured screen,
      wherein the created first and second streams are transmitted to the user device to cause the user device to generate a playback screen by overlaying the transparent portion of the captured screen with a decoded version of the first stream.

2. A user device for requesting content of a cloud streaming server, the content including first data corresponding to a video chunk having a given split length and second data corresponding to remaining data except the first data, the user device comprising:
   a memory storing instructions; and
   one or more processors configured to execute the instructions stored in the memory and to:
      receive a first stream which is created at the cloud streaming server by transcoding the first data without playing the first data at the cloud streaming server;
      receive a second stream created by capturing and encoding an execution screen rendered at the cloud streaming server by executing when the second data at the cloud streaming server, the rendered execution screen including a transparent portion;
      decode the first stream to generate a decoded version of the first stream;
      decode the second stream to generate the captured execution screen; and
      create a playback screen by overlaying the transparent portion of the captured execution screen with a decoded version of the first stream.

3. A cloud streaming service method performed by a cloud streaming server, the method comprising:
   receiving first data of content from a content server when a request for the content is received from a user device, wherein the content includes the first data corresponding to a video chunk having a given split length and second data corresponding to remaining data except the first data;
   creating, without playing the first data at the cloud streaming server, a first stream by transcoding the first data to a suitable format for processing at the user device;
   receiving the second data from the content server;
   render an execution screen of the content by executing the second data, the execution screen including a transparent portion;
   capturing the rendered execution screen;
   creating a second stream by encoding the captured execution screen; and
   transmitting the created first and second streams to the user device to cause the user device to generate a playback screen by overlaying the transparent portion of the captured screen with a decoded version of the first stream.

4. A cloud streaming service method performed by a user device, the method comprising:

receiving a first stream from a cloud streaming server, the first stream representing a transcoded version of first data of content, the first stream generated at a cloud streaming server without playing the first data at the cloud streaming server, wherein the content including the first data corresponding to a video chunk having a given split length and second data corresponding to remaining data except the first data;

receiving a second stream from the cloud streaming server, the second stream being created by capturing and encoding an execution screen rendered by executing the second data, the execution screen including a transparent portion;

decoding the first stream to generate a decoded version of the first stream;

decoding the second stream to generate the captured execution screen; and creating a playback screen by overlaying the transparent portion of the captured execution screen with a decoded version of the first stream.

* * * * *